United States Patent [19]
Proulx et al.

[11] Patent Number: 5,736,044
[45] Date of Patent: Apr. 7, 1998

[54] FILTER CARTRIDGE CONSTRUCTION AND PROCESS FOR FILTERING PARTICLE-CONTAINING PAINT COMPOSITIONS

[76] Inventors: Stephen Proulx, 601 Newton Rd., Littleton, Mass. 01460; Paul J. Cook, 8 Washington St., Manchester-by-the-Sea, Mass. 01944; Michael L. Heise, 417 Scott Road, Cambridge, Ontario, Canada, N3C 4A5

[21] Appl. No.: 783,680

[22] Filed: Jan. 15, 1997

Related U.S. Application Data

[62] Division of Ser. No. 552,682, Nov. 3, 1995.

[51] Int. Cl.⁶ ..................................................... B01D 27/06
[52] U.S. Cl. ...................... 210/488; 210/492; 210/493.4
[58] Field of Search ............................ 210/483, 488, 210/489, 492, 493.1, 493.3, 493.4, 493.5

[56] References Cited

U.S. PATENT DOCUMENTS 3,724,673  4/1973  Ryon .
3,960,730  6/1976  Miller .

FOREIGN PATENT DOCUMENTS 2 188 563  10/1987  United Kingdom .

*Primary Examiner*—Robert Popovics
*Attorney, Agent, or Firm*—John Dana Hubbard; Paul J. Cook; Timothy J. King

[57] ABSTRACT

A filter element for filtering a particle-containing paint composition or a particle loading slurry composition which is a precursor to a particle-containing paint composition is provided. The filtration element comprises at least one filtration layer formed from woven polymer fibers and having substantially uniform pores and two spacer layers. The spacer layers have raised projections to create a space between adjacent spacer layers having contacting projections. The filtration element has a pleated or spirally wound configuration.

7 Claims, 16 Drawing Sheets

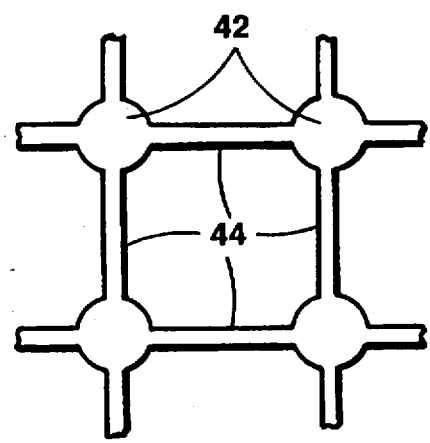
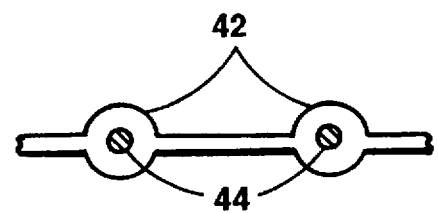
Fig. 4
Fig. 3

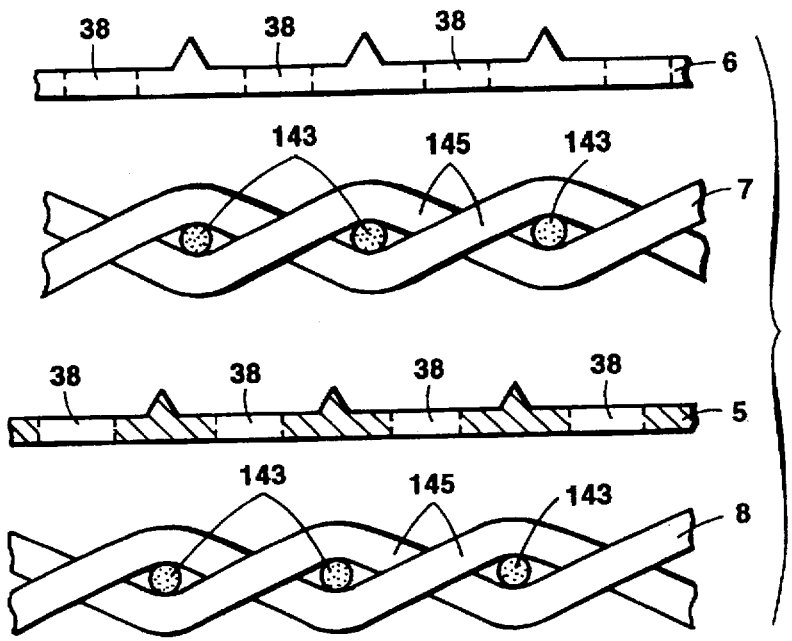
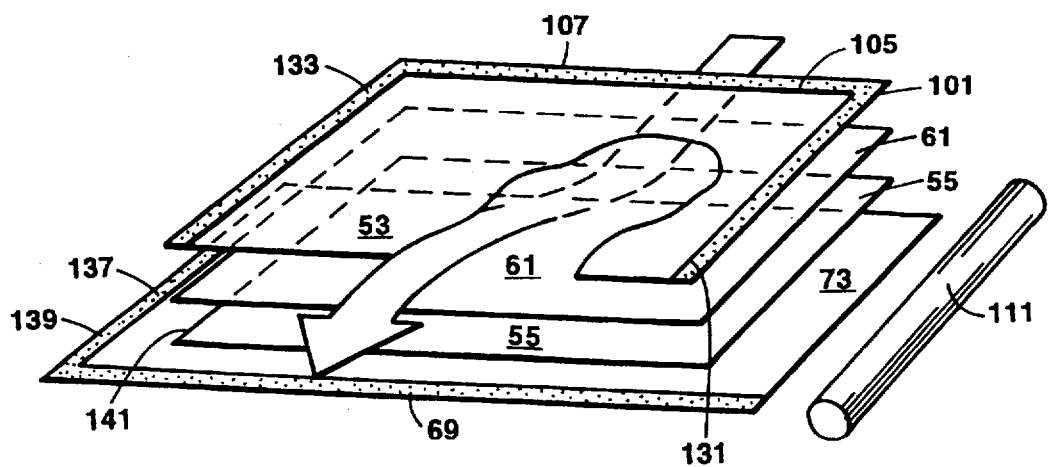
Fig. 17
Fig. 16

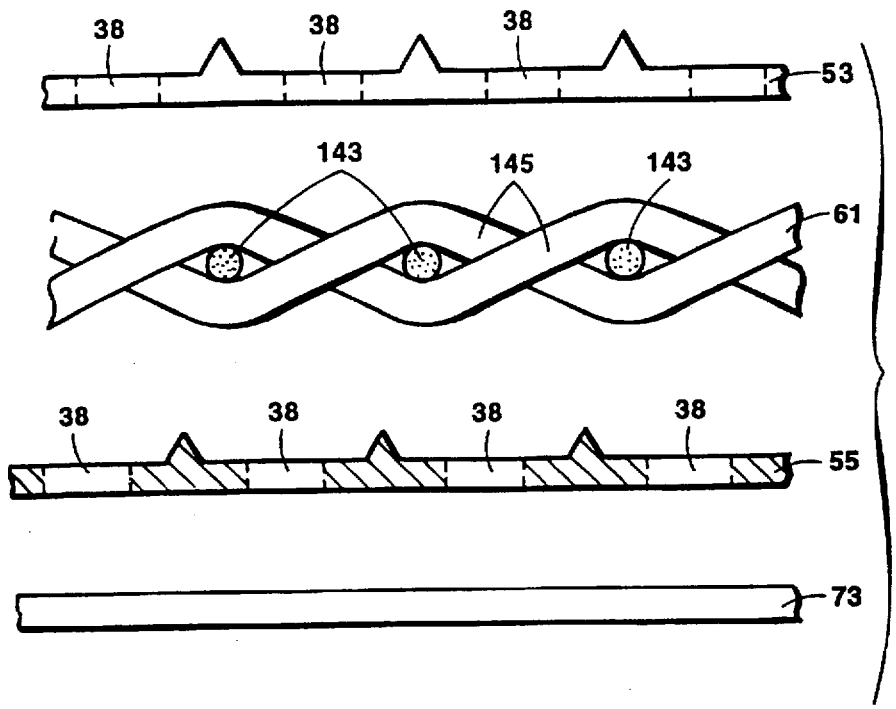
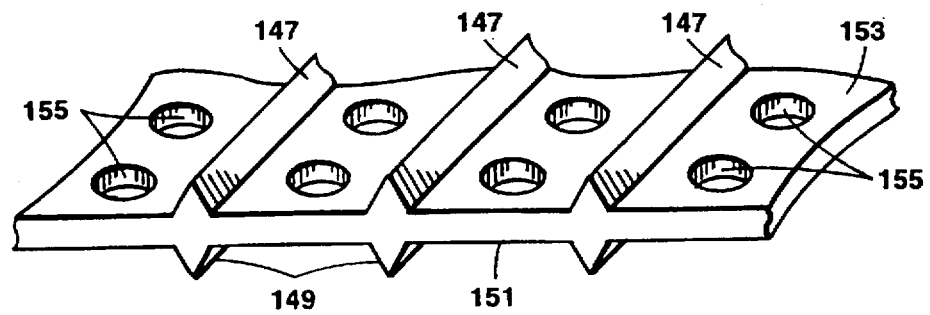
Fig. 18
Fig. 19

FILTER CARTRIDGE CONSTRUCTION AND PROCESS FOR FILTERING PARTICLE-CONTAINING PAINT COMPOSITIONS

This is a division of application Ser. No. 08/552,682, filed Nov. 3, 1995, now pending.

BACKGROUND OF THE INVENTION

This invention relates to a filter cartridge construction suitable for filtering a slurry composition comprising solid particles in a liquid carrier. More particularly, the present invention relates to a filter cartridge construction for filtering a particle-containing paint composition or slurry for making a particle-containing paint composition including a pleated or spirally wound filter element formed from a woven fabric having uniform sized openings and spacer layers on each filter layer surface. The present invention also provides a process for filtering a particle-containing paint composition or a precursor slurry useful for forming a particle-containing, paint composition.

At the present time, compositions comprising a liquid carrier and solid particles such as a particle-containing paint, herein after "particle-containing paint composition" are filtered to remove over-sized particle by utilizing a depth filter or a bag filter. The depth filter is generally formed from a layer or multiple layers of various fibrous filter media which are wound or blown around a central hollow core that accepts the filtrate. When filtering particle-containing paint compositions, the purpose of the filter is to (a) retain only the large undesirable metal particles which can form imperfections in the final dried paint surface which resembles an orange peel surface and (b) allow the smaller sized desired particles to pass through the filter. Filtration of the particle-containing paint composition is effected up to the point the filter becomes plugged with over-sized particles and smaller particles. The gradual retention of the desired size smaller particles by the filter causes a significant reduction in useful filter life. When filtering particle-container paint compositions, a typical useful life of a presently available depth filter for removing over-sized particles is between about 30 and about 60 minutes. When the filter is plugged, a pressure drop larger than desired across the filter is obtained which renders it useless for its intended purpose. The plugged filter must be disposed of in an environmentally acceptable manner. The disposal cost is a direct function of the useful life of the filter.

Woven screen filters formed from woven stainless steel fibers presently are employed in steam lines or in chocolate manufacturing to remove undesirably large particles from either the steam or the chocolate. These screens generally are unsupported screens. Screen filters formed from woven polymeric fibers such as polypropylene fibers are also available. These screens can be made with openings of varying size depending upon the closeness of the weave utilized to form the fabric. Varying weave patterns can be utilized to form the fabric filter. Square weaves comprise a simple over-and-under pattern, providing a straight through flow path with a relatively high percentage of open surface area. The square weave fabrics are used in sifting screens, high flow rate filters, carrier belts, glare-reduction screens, plankton nets, micro-strainer screens, disc sector covers and strainer bags. These screens also can be pleated to be used to filter fuel or hydraulic fluids. This screen also is utilized alone and in a flat configuration to test the efficiency of prior art processes for filtering particle-containing paint compositions. The particle-containing paint composition is deposited on one surface of the screen and is passed through the screen to determine whether there are particles retained on the screen which should have been retained in the prior-used paint filtration process. Other weaves for fabric filters include twill weave, plain reverse dutch weave and taffeta weave fabrics.

A surface or screen filter will retain virtually 100% of the particles or contaminants for which it is rated. The media used in the surface or screen filter typically has a high pressure drop and low "dirt holding capacity" or throughput because of its high retention efficiency. The normally used medium in the surface or screen filter comprises a polymeric microporous membrane or a woven screen. Particles are retained by size exclusion primarily on the surface of the screen filter which has a controlled pore size rather than within the depth of the filter. Particles smaller than the controlled pore size tend to be trapped within the media of the surface filter. However, as a result of the controlled pore structure, they provide more predictable filtration than depth filters. For the surface of screen filter to be economical, the media is pleated to obtain a large filtration surface area. Wound depth filters and surface or screen filters are utilized in series in separate housings to effect the desired level purification.

Particle-containing paint compositions generally comprise a polymer such as a polyacrylic such as polyacrylic acid, a latex or the like; a solvent for the polymer; a colorant composition such as a pigment and light reflecting particles such as metal or mica or mixtures thereof. The particle-containing paint composition contains solid light-reflecting particles such that the viscosity of the final paint composition typically is between about 150 and 800 centipoises (cp). The light reflecting particles have a largest dimension sufficiently small so that when the paint is dried as a coating on a substrate, it presents a smooth surface. The largest dimension particle which is desired to be removed from a paint composition while permitting the retention of smaller particles in the composition depends upon the use to which the paint is applied. Typically the largest particle desired will range from about 10 to about 100 microns. Typically-used light reflective particles in particle-containing paint compositions include a metal such as aluminum, silver or gold or mica or mixtures thereof. Generally, a particle-containing paint composition is formed in a multi-step process including a step of mixing light reflective particles, usually as flakes with a liquid carrier such as water, water containing low concentrations of an aromatic solvent or an aromatic hydrocarbon such as xylene or toluene or, methyl ethyl ketone or the like which is also a solvent for the polymer constituent of the paint composition. This composition is referred to herein as the particle loading slurry composition. The loading slurry composition is highly viscous to the extent that it is difficult to pour from an open container even when the container is inverted with the opening down. After the polymer, solvent and colorant constituents have been mixed, the appropriate volume of the particle loading slurry composition is mixed therewith to form the particle-containing paint composition.

In the past the procedure which was followed, included mixing the paint composition for several days while color and viscosity were adjusted. The final product was filtered as it was pumped into shipping containers. Quality requirements were not stringent and most filtration was done using resin bond cartridges and later felt bag filters. During the last few years formulations and painting techniques have changed. Paint is now a much more high solids slurry with fewer coats of paint being needed to produce final surface color. In addition, the thickness of paint layer has decreased to approximately 25 microns which has precipitated more stringent requirements for acceptable contaminant size and quantity. Existing techniques for filtration no longer are effective especially when all filtration is confined to the filling step wherein the flake is added to the final paint composition. Presently available depth filter cartridges characterized by very flat retention curves are now plugging as they are remove very small percentages of the now highly concentrated pigments and light reflecting particles. This plugging problem is more predominant with the particle-containing paint because of the non specific retention obtained with the less retentive grades of depth cartridges. This result is common to all graded density depth cartridges.

Theoretically, the most desirable method to overcome this problem is to prefilter the slurries before they are added to the final mix followed by a final filtration during the filling. However there has been no filter available that can process these high solids metal solutions economically. Excessive amounts of satisfactory particles are undesirably removed while rapid filter plugging is experienced.

It would be desirable to provide a filter cartridge construction having an extended useful life as compared to present filter cartridge constructions utilized to filter slurries such as particle-containing paint compositions or the particle loading slurry composition for particle-containing paint compositions. Furthermore, it would be desirable to provide such a filter cartridge which selectively permits passage of particles of a desired size through the cartridge while selectively retaining particles larger than that of the desired size so that retention of desired sized particles is minimized or eliminated. Such filter cartridges, would provide substantial improved economic benefit from the standpoint of increased satisfactory throughput fluid volume capacity and low disposal costs.

SUMMARY OF THE INVENTION

This invention comprises a filter cartridge construction utilizing a filtration medium comprising a filter element formed from a woven fiber filter layer having uniform sized pores and a spacer layer in contact with each surface of the woven fibrous filter layer. The filter element can have either a pleated configuration or a spirally-wound configuration. In either the pleated or the spirally-wound configuration, a layer of the woven fiber filter layer is spaced apart from the next adjacent filter layer or layers by a spacer layer so that the slurry can enter the filter layer and can be removed from the filter layer. At least one surface of the spacer layers is provided with spaced apart elevated projections extending the width and/or the length of the spacer layer, continuously or as discrete projections. The elevated projections serve to separate a layer contacting the projections away from the filter layer so that flow into the filter layer or from the filter is facilitated with a minimum of filter layer plugging. The spacer layers permit flow of the slurry, e.g. particle-containing paint composition into a space between adjacent filter layers and prevent blockage of flow between adjacent filter layers which would occur when the adjacent filter layers contact each other under pressure. Thus, blockage of the filter by desired size particles is minimized or eliminated.

In the pleated configuration, the filter layer and two spacer layers, one on each surface of the filter layer, are pleated as a unit to form a pleated filter element and the free ends of the pleated filter element are sealed together along their length. If desired a plurality of spacer layers can be positioned or one or both surfaces of the filter layer to improve slurry flow into and from the filter layer. The pleated filter element is positioned about a hollow core and is positioned within a hollow housing to form a filter cartridge. The filter cartridge, in turn, is used by being positioned within a cartridge housing having an inlet and an outlet for the particle-containing paint composition or particle loading slurry composition. The inlet can be in direct fluid communication with the core or with the space between the cartridge housing and the hollow housing which surrounds the filter cartridge. The pleated filter element can be utilized alone or with a prefilter layer or layers. The prefilter layer or layers is/are positioned within the housing adjacent the fluid inlet.

The spiral-wound cartridge is formed either (a) from two filter layers and two porous spacer layers or (b) a filter layer, two porous spacer layers and a nonporous layer which are spirally-wound together so that each surface of each of the filter layers contacts a porous spacer layer. As with the pleated configuration, a plurality of spacer layers can be positioned on one or both surfaces of the filter layer to improve slurry flow into and from the filter layer. The spirally-wound cartridge has a spiral surface adjacent an inlet to a housing surrounding the spirally wound filter cartridge and a spiral surface adjacent an outlet from the housing. During formation of the spirally-wound cartridge, adhesive is applied at the layer surfaces ultimately forming the spirally-wound surfaces so that inlets to the filter cartridge are provided at a first porous spacer adjacent the housing inlet while openings to the second spacer layer on the inlet spirally-wound surface are blocked. The adhesive is applied at the outlet spirally-wound surface to block outlets from the first spacer layer having the open inlets while retaining outlets open on the second spacer layer having its inlets blocked by adhesive. Thus, a particle-containing paint composition or particle loading slurry composition entering the filter cartridge at the inlet spirally-wound surface must pass through a filter layer before passing from the filter cartridge via the second spacer layer. The spirally-wound layers are sealed along an end thereof adjacent a central core about which the layers are spirally-wound. Similarly, the ends of the layers opposite the core are sealed so that particle-containing paint composition or the particle loading slurry composition entering the spirally-wound cartridge must always pass through at least one filter layer.

If an adhesive is used to form a filter cartridge element of this invention, the portion of the filter layer adhered to a second portion of the cartridge will be blocked. The portion of the surface of the filter layer which is not so-blocked is referred to herein as the "unblocked surface". The unfiltered particle containing paint composition or unfiltered particle containing loading slurry composition contacts an entire surface of each filter layer. As used in this context, "unfiltered" means compositions which have not passed through a filter layer and which may have passed through a spacer layer.

BRIEF DESCRIPTION OF THE DRAWINGS

FIG. 3 is a top view of an alternative spacer layer useful in the present invention.

FIG. 4 is a side view, in partial cross section of the spacer layer shown in FIG. 3.

FIG. 16 illustrates fluid flow through the cartridge of FIG. 14.

FIG. 17 is an exploded cross sectional view of the four contiguous layers shown in FIG. 12.

FIG. 18 is an exploded cross sectional view of the four contiguous layers shown in FIG. 15.

FIG. 19 is a perspective cross sectional where of an alternative porous spacer utilized in the present invention.

DESCRIPTION OF SPECIFIC EMBODIMENTS

Figure 1:
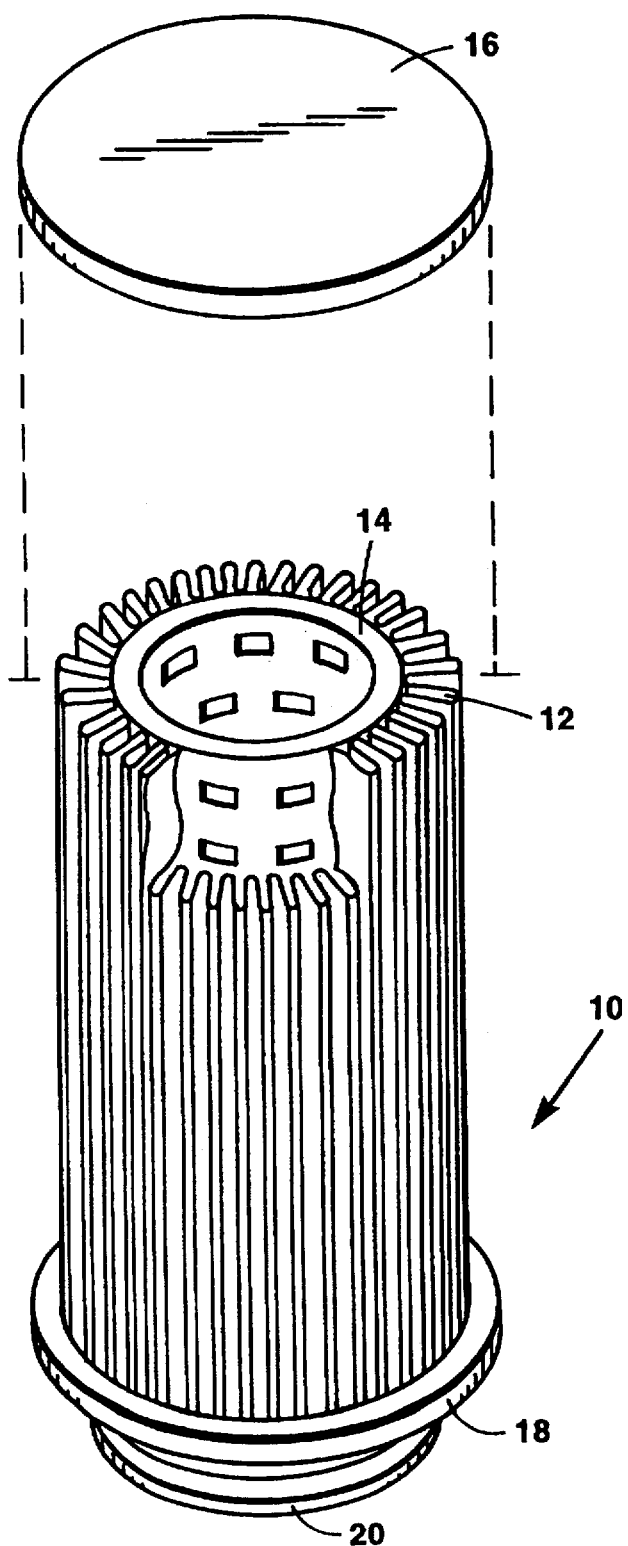
FIG. 1 is perspective view in partial cross section of the filter cartridge of this invention.

The present invention provides a filter cartridge construction suitable for filtering particle-containing paint compositions containing light reflecting particles or particle loading slurry compositions containing metal and/or mica light reflecting particles or the like. Typical particle-containing paint compositions contain between about 0.5 and about 30 weight percent light reflecting particles based upon the weight of the paint. Typical particle loading slurry compositions contain between about 5 and about 50 weight percent light reflecting particles based upon the weight of the slurry composition. The filter cartridge of this invention is capable of selectively retaining particles which have a largest dimension which produce surface imperfections on dried paint while permitting passage through the filter cartridge of light reflective particles having a largest dimension which does not cause these imperfections. The filter cartridge of this invention selectively separates the undesirably large particles from the useful light reflective metal and/or mica particles which provide the desirable characteristics to the final dried paint composition. The filter cartridge of this invention provides substantial advantages over the prior art in that the particle loading slurry composition can be subjected to a preliminary filtration step prior to its being diluted in a pigmented paint composition containing a colorant, e.g. pigment or dye, a soluble polymeric composition and a solvent. In addition, the filter cartridge of this invention can be utilized to filter the final particle-containing paint composition thereby to provide additional safety in preventing passage of the undesirably large particles into a paint application means while permitting passage of desired sized particles. It has been found that the filter cartridges of this invention have a useful life generally exceeding approximately 50 to 100 times or more than the useful life of presently employed depth filters and/or bag filters for filtering particle containing paint compositions. In addition, the filter cartridges of this invention are capable of efficiently filtering particle loading slurry compositions while presently employed depth filter or bag filters are not sized they become plugged quickly. Filter cartridges of this invention completely retain the undesired large size particles over this extended life.

The filter cartridges of this invention include a filtration element comprising a filter layers formed of woven polymeric fibers such as those formed from polyamide, polypropylene or the like. The composition of the fibers is not critical so long as it is not substantially degraded by the constituents of the composition being filtered, such as the solvent. The fibers are woven together to form a fabric containing uniformly sized holes having a largest dimension sufficiently small to effect retention of particles of a given size and larger while permitting passage therethrough of particles smaller than the particles of a given size. The desired sized of the particles of a given size will vary depending upon the application of the final paint composition, e.g. about 10 microns to about 100 microns. In the case of particle containing paints for the exterior surfaces of a motor vehicle, e.g. automobile, the particle of a given size are about 100 microns. Therefore the holes of the woven fabric filter have a size ranging from about 85 microns to about 105 microns. The fabric is capable of retaining particles having the given size dimension such as about 100 microns and larger while permitting the passage therethrough of the smaller size particles. The fabrics can be woven into a variety of conventional weaves including square weaves, twill weaves, plain reverse dutch weave, or taffeta weave. Such fabrics are available, for example from Tetko, Inc., Brian Manor, N.Y. under the trademarks Nitex®, PoCap®, Propyltex® or Fluortex®. These fabrics have uniform sized holes and are woven precisely so that they can be utilized in filtration. The filter element of this invention also include porous spacer layers which contact each surface of the filter layer so that adjacent filter layers are separated by at least one porous spacer layer.

The spacer layers in contact with the filter layer are porous and have a portion of one or both of their surfaces elevated from the remainder of their surfaces so as to promote flow through the filter layer. The pores of the spacer layer have a substantially uniform size typically between about 300 and 600 microns, when the particles of a given size is 100 microns such as are available from Applied Extrusion Technologies, Middletown Del. under the trade name Delnet. The pore size can be varied, as desired depending upon the size of the particles of a given size to be retained.

The elevated portions on a first surface of a spacer layer contact an adjacent layer to separate the adjacent layer from a filter layer in contact with a second surface of the spacer layer so that flow into and from the filter layer is facilitated. Both surfaces of a filter layer are in contact with a spacer layer to effect this desired flow and to avoid plugging of the filter layer. The adjacent layer in contact with layer as is the case when the filter element is spirally wound or can be the same layer folded upon itself as is the case when the filter element is pleated.

It has been found that when spacer layers are utilized which do not have been elevated portions, the pores of the filter layer becomes rapidly plugged, primarily due to bridging of these desired size particles that are smaller than the particles of a given size. The same result occurs when no spacer layers are utilized.

The filtration element can be formed either as a pleat or as a spirally-wound structure having two spirally-wound surfaces wherein one spiral-wound surface comprises the inlet surface and the other spiral-wound surface comprises the outlet surface. The spirally-wound configuration is structured so that all paint entering the inlet surface passes through a filter layer prior to being removed from the filter cartridge at the outlet surface. The fluid flow pattern through of the spirally-wound cartridge is controlled by adhesive applied in a pattern within the spirally-wound layers which assures that the fluid composition containing metal particles passes through a filter layer prior to exiting the spirally wound structure. Both the pleated filter cartridge and the spirally-wound filter cartridge are positioned within a housing having an inlet and an outlet so that a particle-containing paint composition, for example, is introduced into the housing, passed through the filter cartridge and passed out of the housing outlet to be recovered.

The process of this invention comprises passing either a particle loading slurry composition for a paint or a particle-containing paint composition through a mulit layer structure comprising at least one spacer layer on each filter layer surface and the woven filter layer having uniformly sized openings to retain particles of a given size and larger while permitting passage therethrough of particles smaller than the particles smaller than the particles of a given size. The particles of a given size typically range from about 10 microns for paints or lacquers identified in the industry as "clear coat" to about 100 microns. Prior to entering the filter layer, particle containing the paint or particle loading slurry composition is passed through a spacer having a mesh void volume, typically about 20 to 40%. The spacer layer includes portions which are elevated which function to minimize contact with an adjacent spacer layer or filter layer so as to promote flow between adjacent layers and through the filter layer. Thus, the elevated portions function to minimize or prevent blockage of the pores in the filter layer by smaller desired particles which can bridge together. In a preferred embodiment, the elevated portions of the spacer layer have a triangular cross section so that a line defined by the top surface of the triangular cross section only contacts the adjacent spacer layer or filter layer. Other elevated geometries also can be utilized such a circular or elliptical cross-sections.

In one embodiment of this invention, prefilters formed from porous layers such as porous spacer layers can be utilized in conjunction with the embodiment of this invention wherein the filtration element is pleated. The prefilter spacer layers can be utilized in a wound configuration and can be positioned either within the closed pleated filter element or outside of the pleated filter element, depending upon whether the inlet to the filtration cartridge is positioned at the core of the cartridge or through the outside surface of the cartridge. In any event, filtration of the particle-containing paint composition is first effected with the prefilter portion of the cartridge. In another aspect of this invention, the prefilter portion of the cartridge can be formed from multiple spacer layer wherein the first portion utilized for filtration has larger pores, e.g., about 300 microns with spacers having progressively smaller pores utilized in the direction of fluid flow toward the pleated filtration element. Thus, for example, the prefilter can comprise two different spacers, e.g. a first spacer with 300 micron openings followed by a spacer having 200 micron openings used in conjunction with a filtration element containing a woven filter having 100 micron openings. By utilizing this embodiment of this invention, the larger particles in the paint composition being filtered are retained away from the filter layer and a delay in plugging of the filter layer is effected thereby extending the overall life of the cartridge.

When utilizing the pleated configuration of the filter element, the pleats can be in a corrugated shape or spirally positioned and can have a loop cross-section or a folded cross-section such as an M-shaped cross section. As used herein, the term "pleat" or "pleated" is intended to include all such cross-sectional shapes or positions. The pleated structure provides increased surface area which is initially exposed to fluid entering the filter cartridge as compared to a flat or curved non-pleated sheet construction. A non-pleated, wound multi-layer filter element which is wound around a central core would not comprise an efficient filtration cartridge since the outer surface of the cartridge would become plugged with the larger sized solid particles while the interior portions of the wound filtration member would be under utilized. However, the spirally-wound filtration cartridge of this invention is utilized by feeding the incoming particle-containing paint composition into a spirally-wound surface having openings thereon to effect tangential flow across the surface of the filter layer rather than effecting flow through the sides of the cartridge. When operating in this manner, the entire unblocked surface of the filtration layer in the spirally wound cartridge is exposed to initially introduced particle containing paint composition so that all of the filter layers are utilized in the filtration process and preferential plugging does not occur on one filter surface.

Referring to FIG. 1, the pleated cartridge of this invention, 10 is shown. The cartridge 10 comprises a three-layer pleated filtration element 12 which surrounds a core 14 and is provided with a sealing cap 16 and a second cap 18 having an outlet 20.

Figure 2:
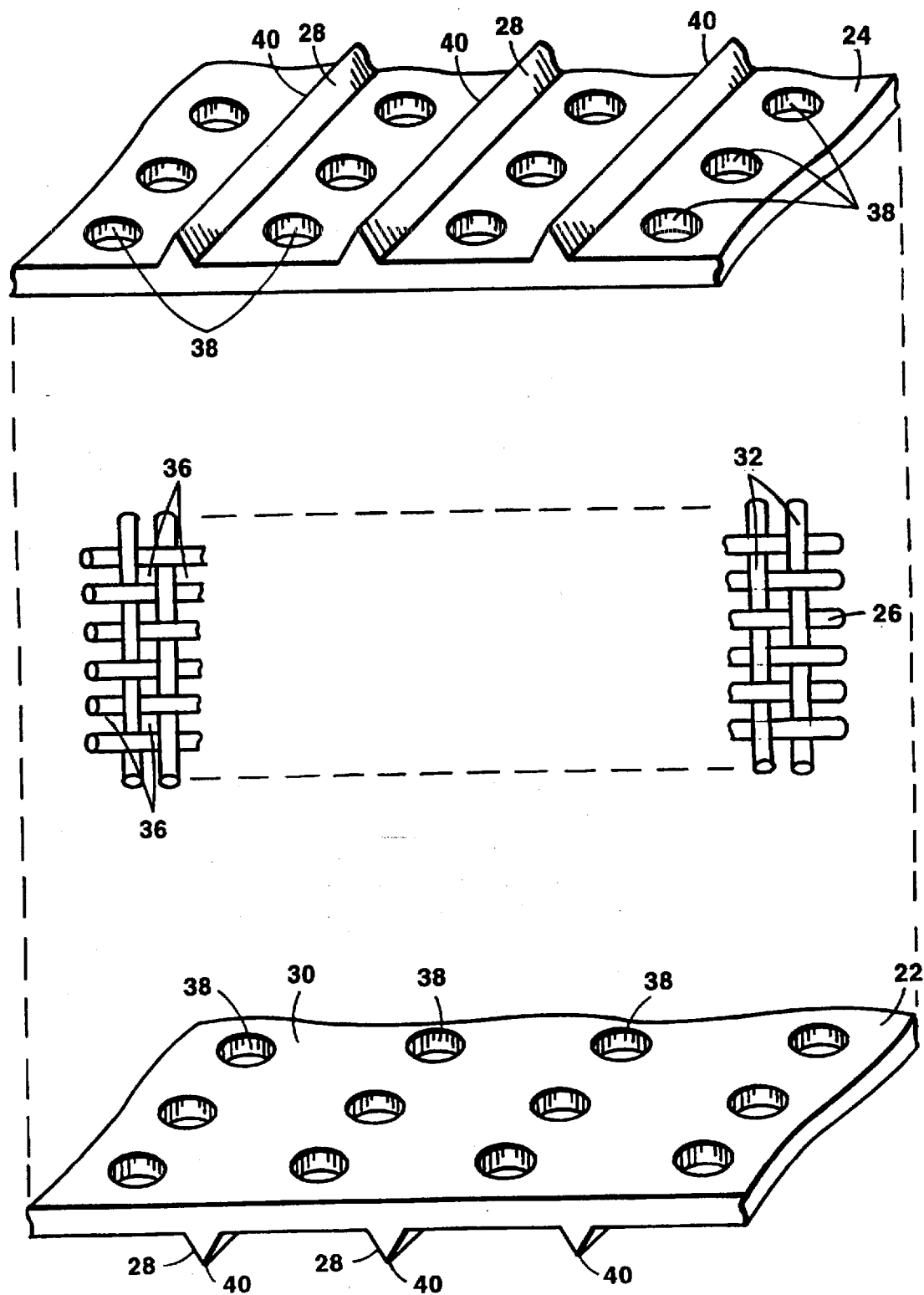
FIG. 2 is an exploded view of the filter layers and spacer layers utilized in the filter cartridge of this invention.

Referring to FIG. 2, the pleated filtration element 12 is formed from two porous spacer layers 22 and 24 and a woven filtration layer 26. The spacer layers 22 and 24 include raised longitudinal ribs 28 which function to minimize or prevent contact of the adjacent spacer layer 22 and 24 when they are contacted in the pleated configuration. In addition, the woven configuration of filtration element 26 minimizes contact of the spacer layers 22 and 24 with the uniform opening 36 of the filtration element 26. The spacer elements 22 and 24 have relatively uniform openings 38 of a size generally between about 3 and about 5 times of the uniform holes in the filter layer so that the particle containing paint composition or particle loading slurry composition can easily pass through the spacer elements 22 and 24 and so that filtration can be effected by filter layer 26 wherein the pores 36 generally have a largest diameter corresponding to the smallest particle diameter to be removed. For example, the pores 36 typically has a size between about 85 and 100 microns. By utilizing this structure, flow of the particle containing paint composition or particle loading slurry composition into and out of the filter layer is significantly imposed as compared to the filtration element alone.

Any configuration of the raised portion of the spacer elements can be utilized so long as blockage of the pores 36 of the filtration layer is minimized or prevented. As shown in FIGS. 3 and 4, the raised elements 42 can have a circular cross section joined by arms 44. Other configurations can be utilized so long as they do not substantially impede flow of the particle containing paint composition or particle loading slurry composition through the filtration element 12. (FIG. 1).

Figure 5:
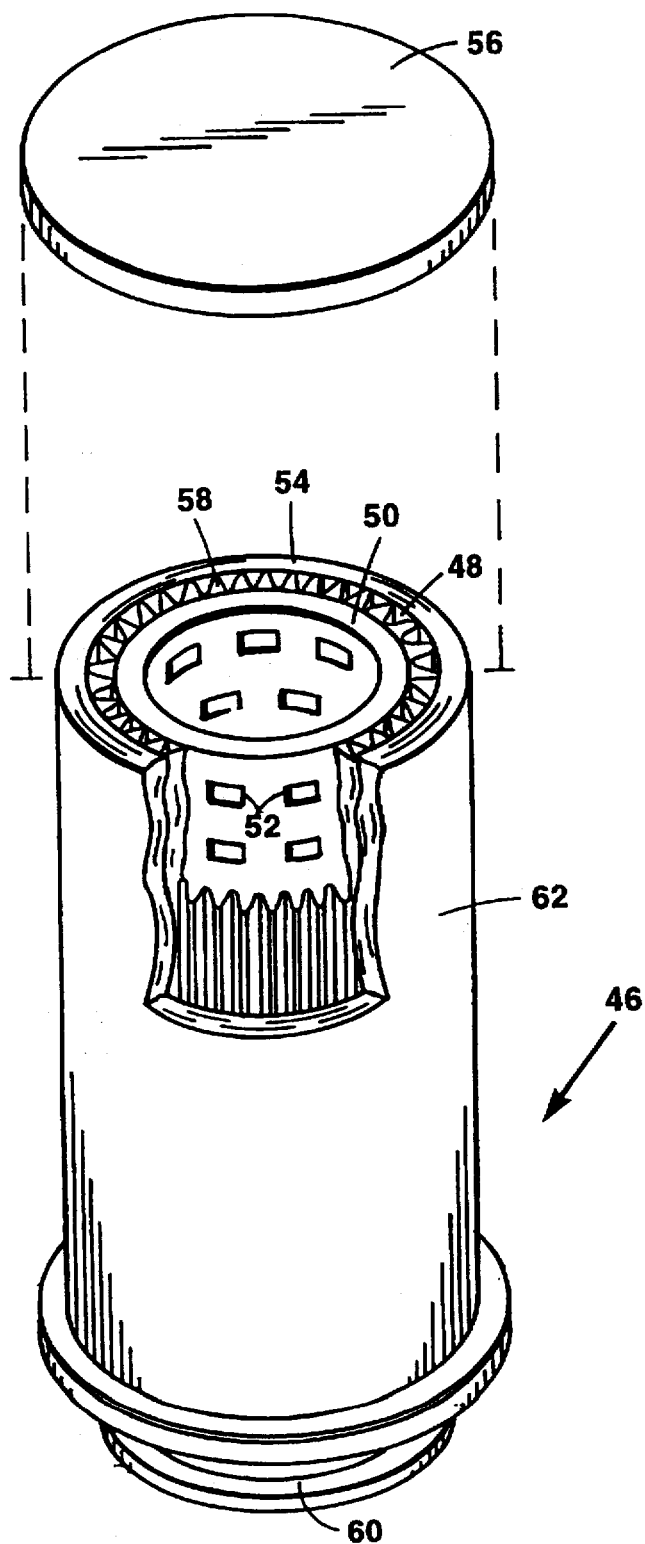
FIG. 5 is a perspective view in partial cross section of alternative filter cartridge construction of this invention.

Referring to FIG. 5, an alternative filtration cartridge 46 of this invention is shown. The filtration cartridge includes a pleated filtration element 48, and inner core 50 having holes 52 and a wound prefilter section 54. The wound prefilter section 54 can have the configuration of the spacers 22 and 24 shown in FIG. 2 wherein the size of the holes typically are between about 3 and 5 times the size of the uniform holes of the filter element. The cartridge 46 includes a sealing cap 56 which seals the surfaces 58 and outlet 60 so that incoming particle containing paint composition or particle loading slurry composition must pass through surface 62 initially.

Figure 6:
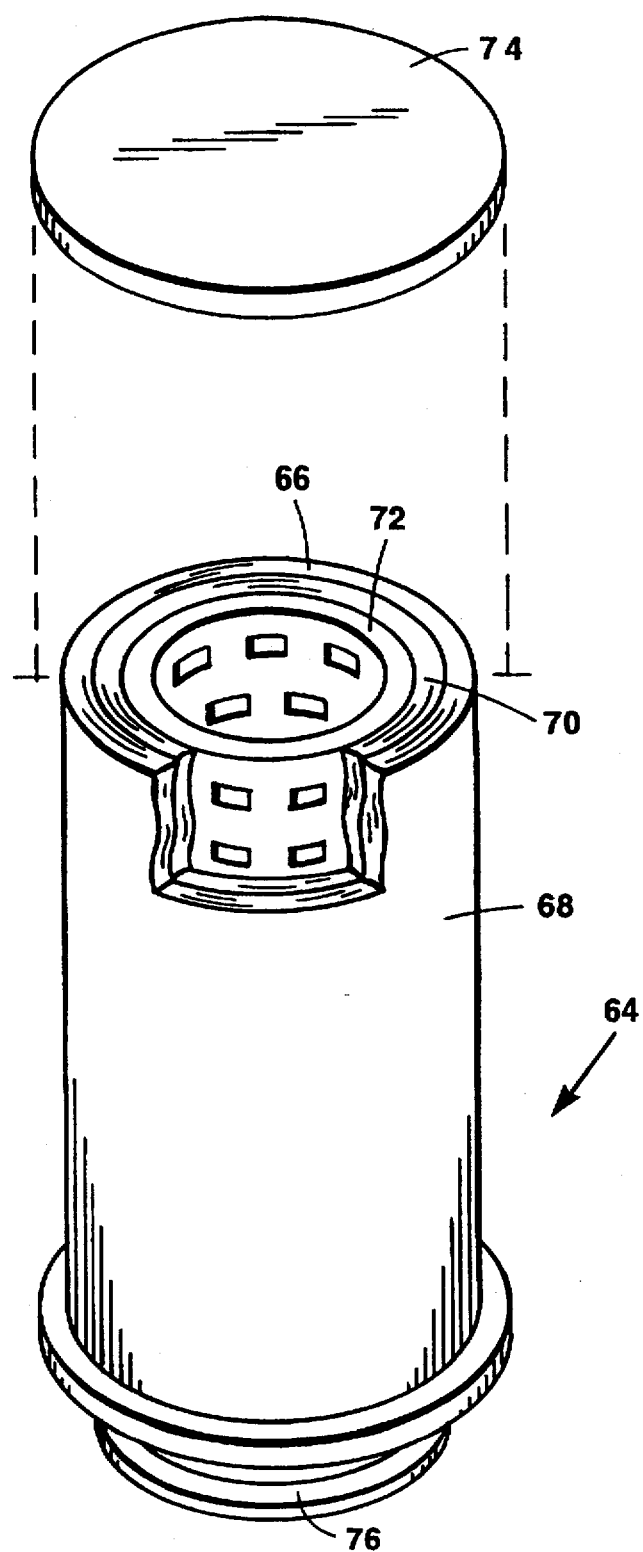
FIG. 6 is a perspective view in partial cross section of a prior art depth filter utilized to filter particle-containing paint compositions.

Referring to FIG. 6, the prior art construction of a depth filter cartridge 64 includes a wound depth filter 66 which includes an outer surface 68 a second wound filter 70 having pores of a smaller size than the pores of wound depth filter 66 are positioned adjacent a porous core 72. The cartridge includes an end cap 74 and an outlet 76 which are sealed to the cartridge 64 to effect flow from surface 68 into core 72 and out outlet 76. The filter cartridge shown in FIG. 6 ordinarily plugs within about 30 to 60 minutes when utilized to filter particle containing paint composition. It is not useful for filtering a particle loading slurry composition since it plugs very rapidly.

Figure 7:
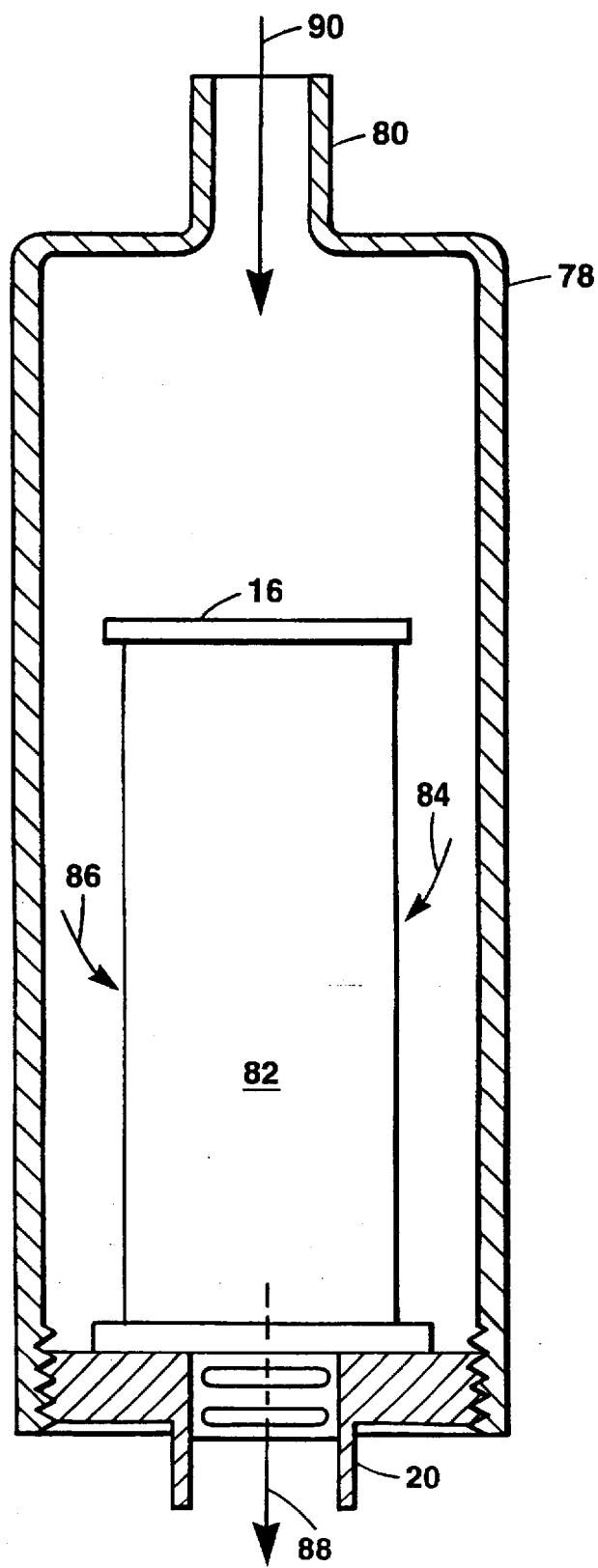
FIG. 7 is a cross section elevational view of the filter cartridge of this invention positioned within a housing during use.

Referring to FIG. 7, the use of the pleated cartridge embodiment of this invention is illustrated. A pleated cartridge 10 is positioned within housing 78. Incoming particle containing paint composition or particle loading slurry composition enters inlet 80 of housing 78 passes through outer surface 82 as indicated by arrows 86 and 84 and out outlet 20 as indicated by arrow 88. When it is desired to utilize the outlet 20 as the inlet and the inlet 80 as the outlet, the direction of arrows 88, 84, 86 and 90 is reversed so that filtered product is obtained from element 80.

Figure 8:
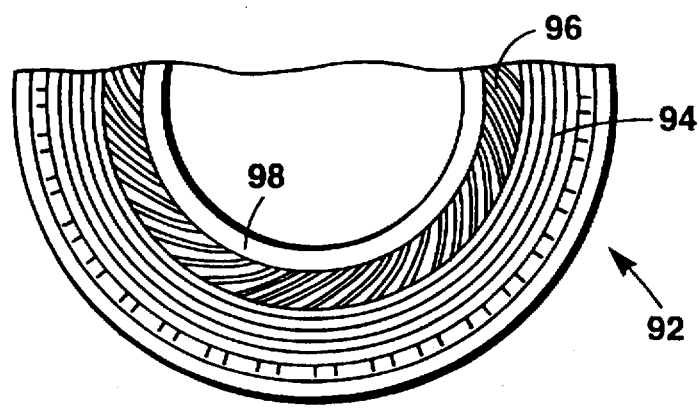
FIG. 8 is a cross sectional view of an embodiment of this invention utilizing a spiral pleated-screen element.

Referring to FIG. 8, the filter cartridge 92 includes a wound spacer layer 94 which can have a plurality of layers having differing micron retention characteristics and a spiral pleated filter element 96 formed from the layers shown in FIG. 2 and porous core 98. If desired, a porous sleeve can be interposed between wound spacer layer 94 and the pleated filter element 96 to provide support and promote fluid flow.

Figure 9:
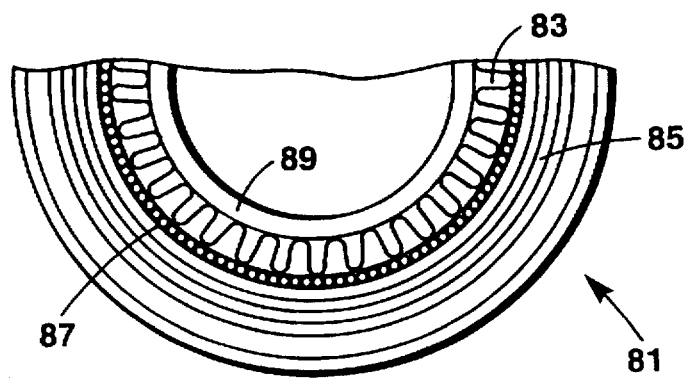
FIG. 9 is a cross sectional view of an embodiment of this invention utilizing a pleated filter spacer element and an internal support sleeve.

Referring to FIG. 9, an alternative filter cartridge 81 of this invention is shown. The cartridge 81 includes a pleated filter element 83 and a wound spacer layer 85 which are separated by screen 87. The cartridge 81 includes porous core 89.

Figure 10:
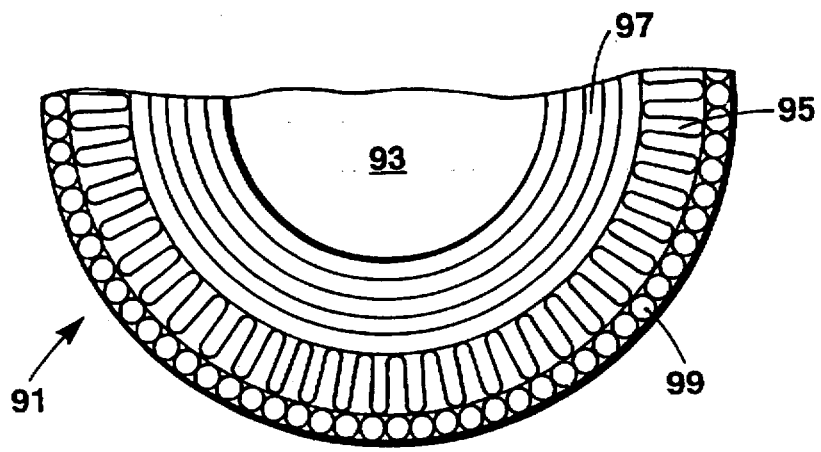
FIG. 10 is a cross sectional view of an embodiment of this invention wherein the inlet is positioned within the core of a filter cartridge of this invention.

Referring to FIG. 10, the filter cartridge 91 has an inlet 93 positioned at the central portion rather than having the outlet position at the central position thereof as exemplified by filter cartridge 48 of FIG. 5. The filter cartridge 91 includes a pleated filter element 95, a wound spacer layer 97 and a support screen 99 flow of particle containing paint composition or particle loading slurry composition to the filters is in the direction the reverse of the arrows shown in FIG. 7.

Figure 12:
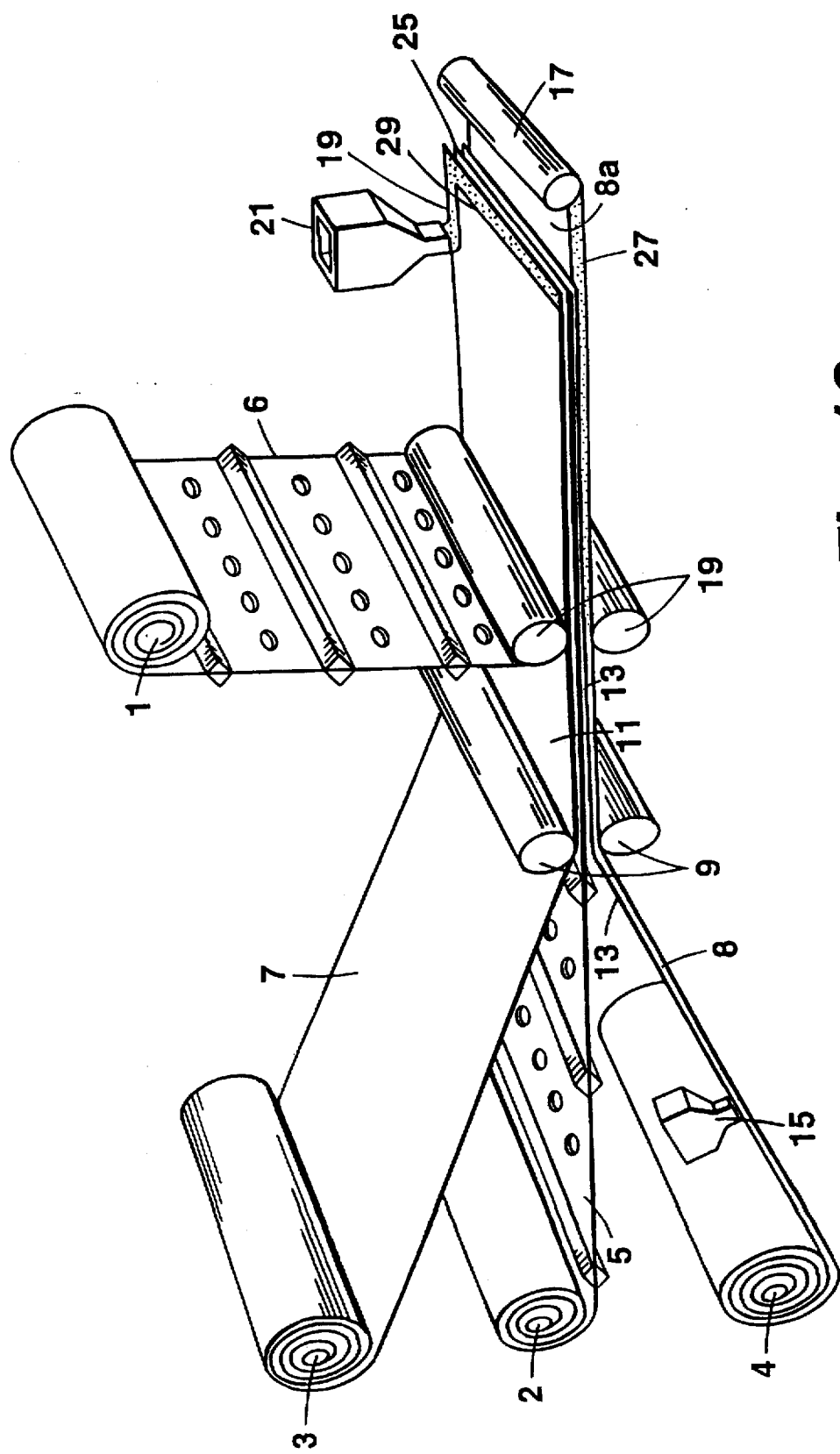
FIG. 12 is a schematic diagram of one method of forming the spiral construction of FIG. 11.

As shown in FIG. 12 a porous spacer material having a high percentage of void volume and which is permeable to edgewise flow is stored respectively on storage rolls 1 and 2 and woven filter material is stored on storage rolls 3 and 4. The spacer layer 5 and the filter layers 7 and 8 are passed through a set of rollers 9 so that they are held in close relationship across their width to form a multi-layer web 11. An adhesive strip 13 is dispensed from dispenser 15 and placed upon the moving filter layer 8 as it is unrolled from storage roller 4 so that when contacted with spacer layer 5, which is permeable to the adhesive and filter layer 7, a seal is formed by adhering the three layers 5, 7 and 8 as they are passed between rollers 9.

The adhesive employed does not effect immediate permanent adhesion of the layers when the webs pass between the pressure rollers 9. The adhesive is chosen so that the multi-layer web can be rolled on the core 17 prior to curing the adhesive and the adhesive is cured after the spiral filter construction is formed. Sufficient adhesive is employed to provide the desired seal between adjacent layers of the web but in amounts less than will migrate through the filter layer and cause undesirable sealing on the opposing filter surface at the same spiral end.

A spacer layer 6, similar to layer 5, is unrolled from storage roller 1 and passed, together with multi-layer web 11, between rollers 19. Adhesive material also is dispensed from the movable dispenser 21 to form a widthwise strip 23 at or near the leading edge 25 of the multi-layer web 27 and a lengthwise strip 29 at or near the lengthwise edge 31 of the multi-layer web 27. As shown in FIG. 12 there is a tab 8a of filter layer 8 which extends to the right beyond the multi-layer web 27. The adhesive strip on this tab is identified as 13a. When the multi-layer web 27 is rolled on filter core 17, adhesive strip 13a on tab 8a and adhesive strip 23 will contact and adhere to the core 17 after one revolution of the core 17, Adhesive strip 23 then will adhere to the filter layer 8. Adhesive strip 29 will adhere to filter layer 8 on the surface and lengthwise edge opposite the surface and lengthwise edge upon which adhesive strip 13 is placed. The desired filter length is attained by cutting the layers 5, 6 and 7 and 8 widthwise. An adhesive strip 51 (See FIG. 13) is applied to the following widthwise edge of the spacer layer 6 so that the final adhesive strip configuration on spacer 6 is U shaped. It should be noted that the adhesive not only adheres the layers together but also fills the pores in the portion of the filter layers which it contacts making these blocked pores substantially impermeable. When using this adhesive configuration, incoming paint or particle loading slurry cannot by-pass a filter layer.

Figure 11:
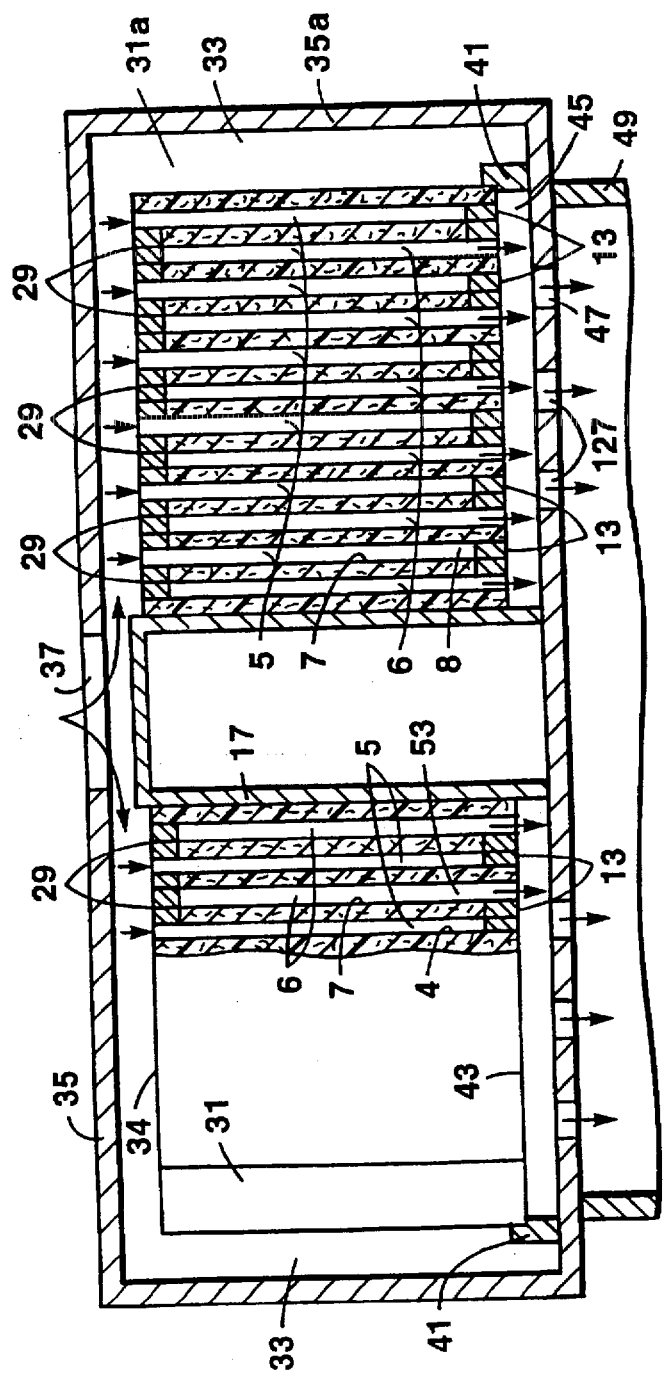
FIG. 11 shows a spiral-wound cartridge of this invention.

The fluid flow path will be described with reference to FIGS. 11 and 13. As shown in FIG. 11, the filter cartridge of invention is shown enclosed in a housing 35. Incoming paint or slurry enters opening 37 of housing 35 and is directed to the top surface 34 of filter unit or cartridge 31a and into the space 33 between the side wall of the housing 35 and the filter cartridge 31a. Alternatively, space 33 can be eliminated by forming the side wall 35a with sealing wall 41 together fit with the side of the cartridge. Fluid is prevented from by-passing the filter cartridge 31a by means of the sealing wall 41 at the bottom of the unit. Incoming fluid fills the space 33 and then is free to pass downwardly through the filter cartridge 31a by entering the void volume in spacer layer 5 by edgewise flow and passing downwardly therein and through the filter layers 7 and 8 into the spacer layer 6. Since the spacer 6 layer is unsealed on the bottom surface 43, the fluid is free to pass downwardly there through and out of the filter cartridge 31a into space 45 formed by the sealing wall 41, the bottom surface 43 of the filter cartridge 31a and the bottom of housing 35. The filtrate passes out of the space 45 through holes 47 in the bottom of the housing 35 into a fluid collector whose side walls are indicated at 49.

Unfiltered fluid is prevented from passing between the outside surface of core 17 and the adjacent spacer layer 6 by means of the adhesive strip 13a adhering the filter layer 8a to the core 17 and layers 6 and 7. Unfiltered fluid in space 33 also can enter the filter 31a through the outermost filter layer 8. However, such fluid entering through filter 8 from the space 33 would have to pass through filter layer 8, spacer layer 5, and filter layer 7 to contact spacer layer 6 which permits the fluid to pass out of the filter cartridge 31a. The pressure differential between space 33 and space 45 is such as to cause flow. If desired, the bottom layer in contact with core 17 can be spacer layer 5 while filter layer 8 can be placed on top of spacer layer 6 to form the multi-layer web. Adhesive is applied in the manner set forth above.

In practice, it has been found that if it is desired to filter fluid from space 33, it is desirable to cut the layers 6 and 7 longer than 5 and 8 to permit an extra wrap of layers 6 and 7 around the outside of the unit. In this way, fluid in the space 33 need pass through only one filter layer, i.e., filter layer 7, and can leave the filter cartridge 31a through the spacer layer 6. In this embodiment, the adhesive configuration is such that the spacer layer adjacent the inside surface of the outermost filter layer is open on the bottom spiral end surface and sealed at the top spiral end surface. Thus, the fluid between the filter housing and the outside surface of the spirally wound filter need pass through only one filter layer prior to exiting the filter construction. Unfiltered fluid is prevented from entering the width of spacer 6 by means of adhesive strip 51. (See FIG. 13)

Figure 13:
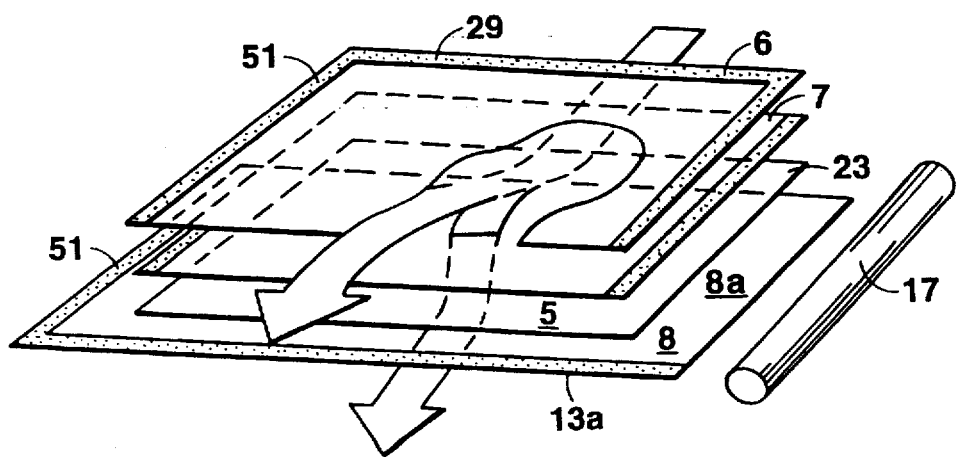
FIG. 13 illustrates fluid flow through the construction of FIG. 11.

As shown in FIG. 13, the filter layer 8 forms the bottom surface of the multi-layer web with the upper layers including respectively, the spacer layer 5, the filter layer 7, and another spacer layer 6. These layers are adhered in the manner described above. The adhesive strip 23 fills the voids in spacer layer 6 and adheres spacer layer 6 to the adjacent portion of filter layer 7 thereby preventing incoming fluid from entering the cartridge 31 into the spacer 6 on the downstream side of the filter layers 7 and 8. The adhesive strips 23 and 51 are applied to the desired locations, depending upon the size of the filter desired, by halting the moving webs and applying the adhesive across the width of the spacer layer 6.

If desired, the spirally wound filter can be wrapped with a separate fluid-impermeable layer; however, the construction shown in FIGS. 12 and 13 is preferred since the liquid in space 31 may be processed.

The type and amount of adhesive employed is such that adhesive will penetrate into the filter layer but not through the filter layer when applied so that sealing on one surface of a filter layer does not result in sealing on the opposite surface. Epoxy or polyurethane-based adhesives are particularly useful for providing the desired sealing.

It is to be understood that the present invention is not limited to the structures specifically shown in FIGS. 11–13 but includes obvious modifications thereof. Thus, a filter construction can be prepared by spirally winding a multi-layer web having more than two filter layers and more than two spacer layers so long as they are arranged so that the spacer layers sealed on opposing surfaces do not contact. Thus, three or more alternating spacer and filter layers can be employed. However, these structures may increase production problems due to the added webs being unrolled and adhesive strips applied. Therefore, it is preferred to form the filter by winding a four layer web as specifically described above, in connection with FIGS. 11, 12 and 13.

Figure 15:
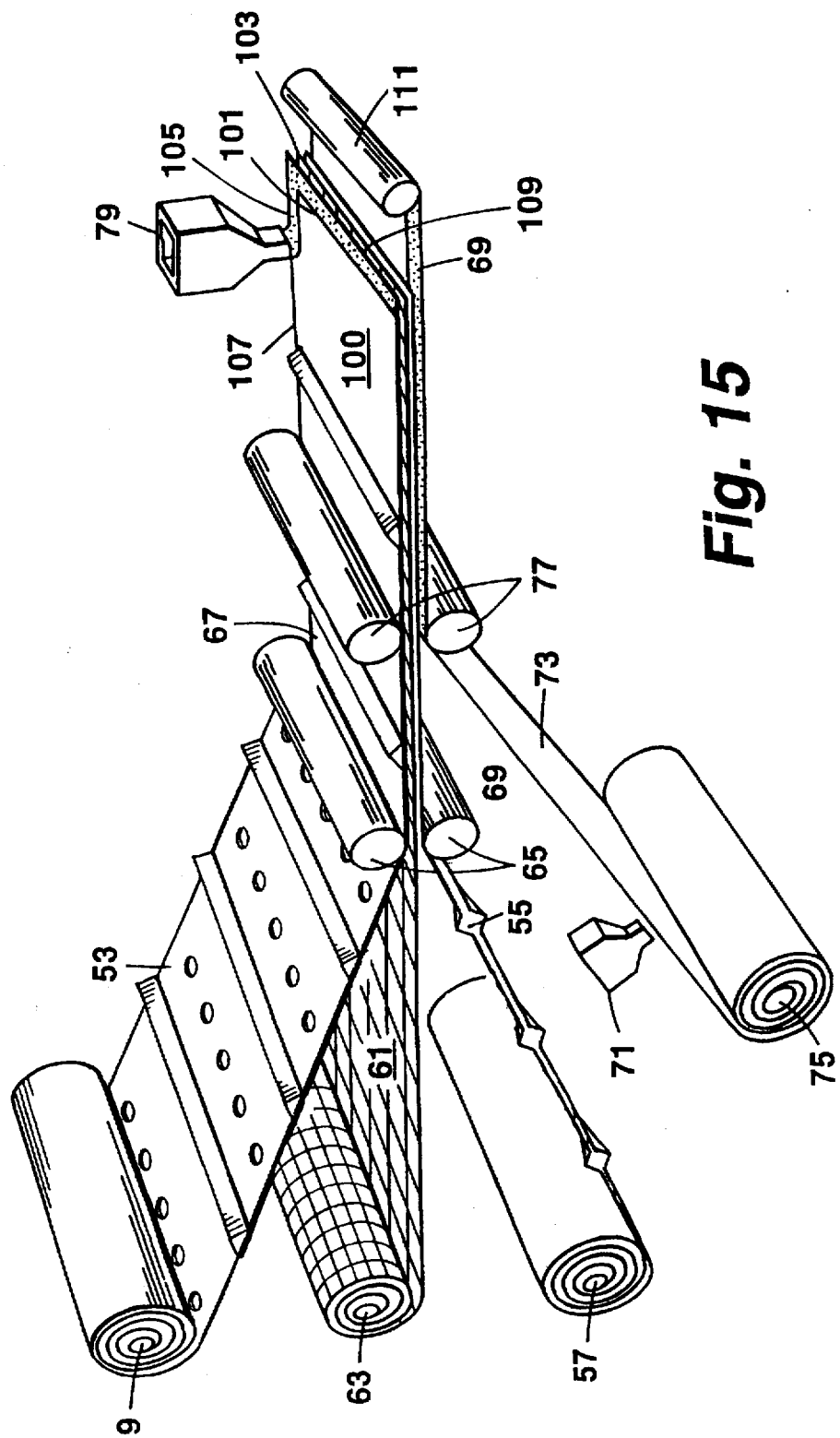
FIG. 15 is a schematic diagram illustrating a method for forming the cartridge of FIG. 14.

Referring to FIG. 15, spacer layers 53 and 55 having a high percentage of void volume are stored respectively on storage rolls 57 and 59 and a woven filter layer 61 is stored on storage roll 63. The spacer layers 53 and 55 and the filter layer 61 are passed through a set of rollers 65 so that they are held in close relationship across their width to form a multi-layer web 67. An adhesive strip 69 is dispensed from dispenser 71 and placed upon the moving liquid-impermeable layer 73 as it is unrolled from storage roller 75. The liquid-impermeable sheet 73 and adhesive 69 then are contact to the spacer layer 75 of the multi-layer web 67 and passed through a set of rollers 77 to adhere the spacer layer 55 to the sheet 73 and one surface of the woven filter layer 61. Adhesive material also is dispensed from dispenser 79 to form a widthwise strip 101 at or near the leading edge 131 of the spacer layer 53 and a lengthwise strip 105 at or near the lengthwise edge 107 of the multi-layer web 109.

The adhesive employed does not effect immediate permanent adhesion of the layers when passing through the roller 77. The adhesive is preferably chosen so that the multi-layer web can be rolled on core 111 prior to curing the adhesive and the adhesive is cured after the spiral filter construction is formed such as by heating. Sufficient adhesive is employed to provide the desired seal between adjacent layers of the web but amounts less than will migrate through the filter layer and cause undesirable sealing of the opposing filter surface on the same spiral end. When the multi-layer web 109 is rolled on filter core 111, the adhesive strip 105 will contact and adhere to the liquid-impermeable sheet 73 on the surface and lengthwise edge opposite the surface upon which adhesive strip 69 is placed. The desired filter length is obtained by cutting the layers 53, 55 and 61 widthwise while permitting layer 73 to be unrolled at sufficient length so that it can enclose the resultant construction. An adhesive strip 133 is applied to the following widthwise edge of the spacer layer 53. In addition, the adhesive strip 69 is continued to the following edge 139 of the sheet 73.

Figure 14:
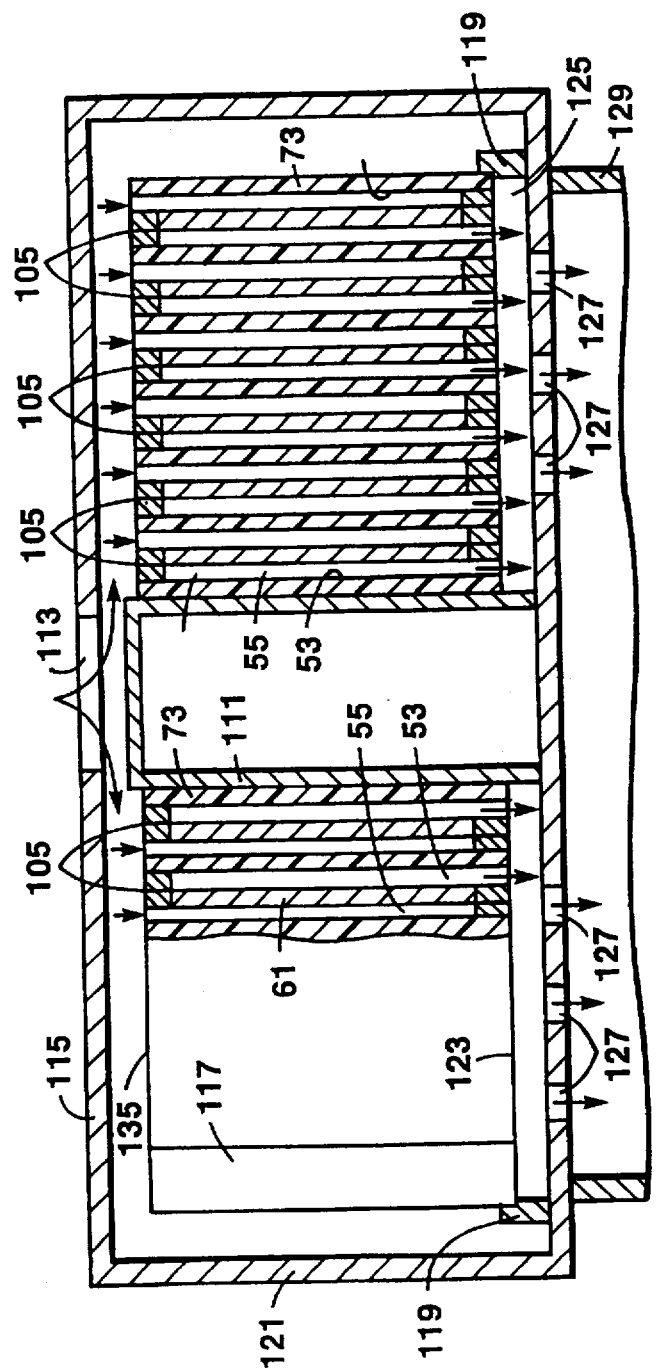
FIG. 14 is a cross sectional view of an alternative spiral-wound cartridge of this invention.

The path of paint or slurry flow through the spiral filter formed as shown in FIG. 15 will be described with reference to FIGS. 14 and 16. Incoming paint or slurry enters opening 113 of housing 115 and is directed to the top surface 135 of filter cartridge 117 and into the space 121 between the housing 115 and the filter cartridge 117. Fluid is prevented from by-passing the filter cartridge 117 by means of sealing wall 119. Incoming fluid fills the space 121 and then is free to pass downwardly through the filter 117 by entering the void volume in spacer layer 55 and passing downwardly therein and through the filter layer 61 into spacer layer 53 in contact with the opposing surface of filter layer 61. Since spacer layer 53 is unsealed on the bottom spiral surface 123, the paint or slurry is free to pass downwardly therethrough and out of the filter 117 into space 125 formed by the sealing wall 119, the bottom spiral surface 123 and the housing 115. The filtrate passes out of the space 123 through holes 127 at the bottom of the housing 115 into a filtrate collector 129. Unfiltered paint or slurry is prevented from passing between the outside surface of core 111 and the adjacent impermeable layer 73 by means of adhesive strip 69 adhering the core 111 and strip 73. Unfiltered fluid is prevented from entering through the edge 131 of the spacer layer 53 by means of adhesive strip 101 which fills the void volume in the spacer layer 53 and adheres spacer layer 53 to the adjacent layers 73 and 61.

As shown in FIG. 16, the liquid-impermeable surface 73 comprises the bottom surface of the multi-layer web with the upper layers comprising respectively a spacer layer 55, a filter layer 61 and another spacer layer 53. These layers are adhered in the manner described above and have adhesive strip 133 on the trailing edge of spacer layer 53 that fills the voids in spacer layer 53 and adheres spacer layer 53 to the adjacent portions of filter layer 61 and liquid-impermeable layer 73 thereby preventing incoming fluid from entering the cartridge 117 into the spacer layer 53 on the down stream side of the filter layer 61. The adhesive strips 101 and 133 are applied at the desired locations, depending upon the size of the filter cartridge desired, by halting the moving layer and applying the adhesive across the width of spacer layer 53. An adhesive strip 137 provides a means for adhering the trailing edge 139 of the liquid-impermeable layer 73. In this embodiment, layer 73 is sufficiently longer than the remaining layers so that it circumscribes the entire filter cartridge to form the outside surface of the cartridge. Alternatively, the trailing edge 139 can be heat sealed to the adjacent sheet. It is unnecessary to cut layer 73 longer than the remaining layers as to employ adhesive strip 137. In fact, when the adhesive strip 137 is not applied, fluid is free to enter the edge 141 into the spacer layer 55 upstream of the filter layer 61. A filter cartridge made by element 80 adhesive strip 137 provides a convenient means for emptying space 121 of fluid to be filtered. In this manner, substantially all of the paint or slurry can be processed through the filter cartridge. When adhesive strip 137 is employed, fluid paint or slurry in space 121 cannot enter the filter cartridge and is lost. Alternatively, strip 137 can be perforated in space 121 on the outside layer 73 only in that portion thereof which forms the outside surface of the filter to permit filtering paint or slurry in space 121.

The fluid-impermeable layer can comprise any flexible material sufficiently strong to prevent fluid passage, even at high pressures. It is desirable that this layer, as well as the filter layer, be relatively thin to maximize filter surface area for a given filter volume. Particularly suitable liquid-impermeable materials include polyvinyls such as polyvinyl chloride, polyvinyl acetate, polyolefins such as polyethylene and polypropylene and polyesters.

A solid core, although preferred, it is not required in forming the spiral filter construction. If desired, the multi-layer web can wound around a mandrel that is subsequently removed and the resultant central space is sealed so that unfiltered paint or slurry cannot bypass a filter layer.

Referring to FIG. 17, the multi-layer web shown in FIG. 12 comprises spacer layers 5 and 6, each having holes 38 and woven filter layers 7 and 8 formed from warp fibers 143 an weft fibers 145.

Referring to FIG. 18, the multi-layer web formed in FIG. 15 includes spacer layers 53 and 55 having holes 38 and woven filter layer 61 formed of fibers 143 and 145 and impermeable layer 73.

Referring to FIG. 19, the alternative spacer includes two sets of ribs 147 and 149, one extending from a surface 151 or 153 of the spacer. The spacer include through holes 155 extending between surfaces 151 and 153 to provide fluid communication through the spacer.

The following examples illustrate the present invention and are not intended to limit the same.

EXAMPLE I

This example illustrates the extended filtration life obtained with the filtering element of this invention as compared to presently employed depth filters for filtering particle-containing paint.

A paint composition containing 25 weight percent of aluminum particles based upon the weight of the paint composition. The 2 inch high depth filtration element was formed of wound layer of polypropylene fibers which was 0.6 inches thick and has a rating of 100 microns. The depth filter was positioned within a 2 inch high housing having an inlet for unfiltered paint and an outlet for filtered paint.

The filtration element of this invention comprised the pleated filtration element shown in FIG. 1 is 2 inches high and is formed from the filter layer and spacer layers shown in FIG. 2. The pleats 12 were 0.46 in long. The holes 38 in the spacer layer had a diameter between 300 and 600 microns. The pores 36 in the filter layer 26 had a size between about 85 and 100 microns. The spacer layers were formed of polypropylene and the fibers forming the filter layer also were formed of polypropylene. The pleated filtration element was positioned within a 2 inch housing having an inlet for unfiltered paint and an outlet for filtered paint.

Figure 20:
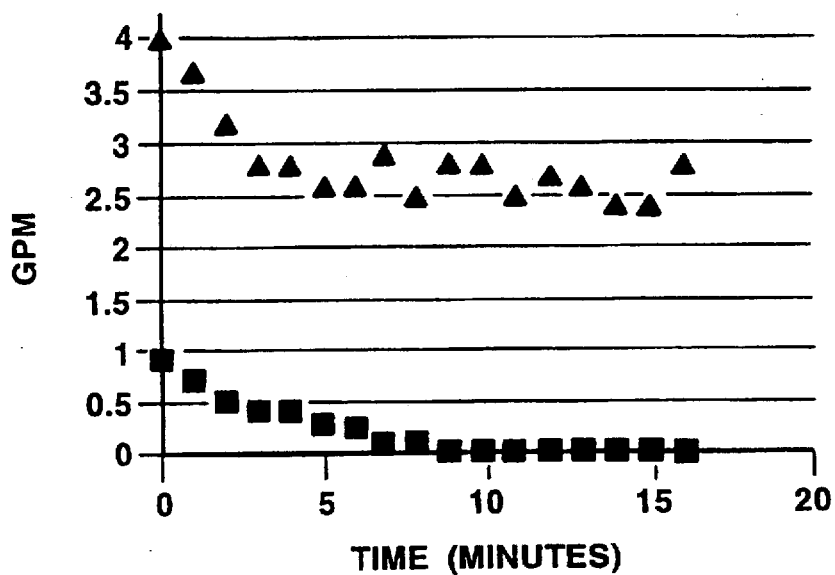
FIG. 20 is a graph comparing filtration rate as a function of time of filtration of a prior art depth filter to the filter of this invention.
Figure 21:
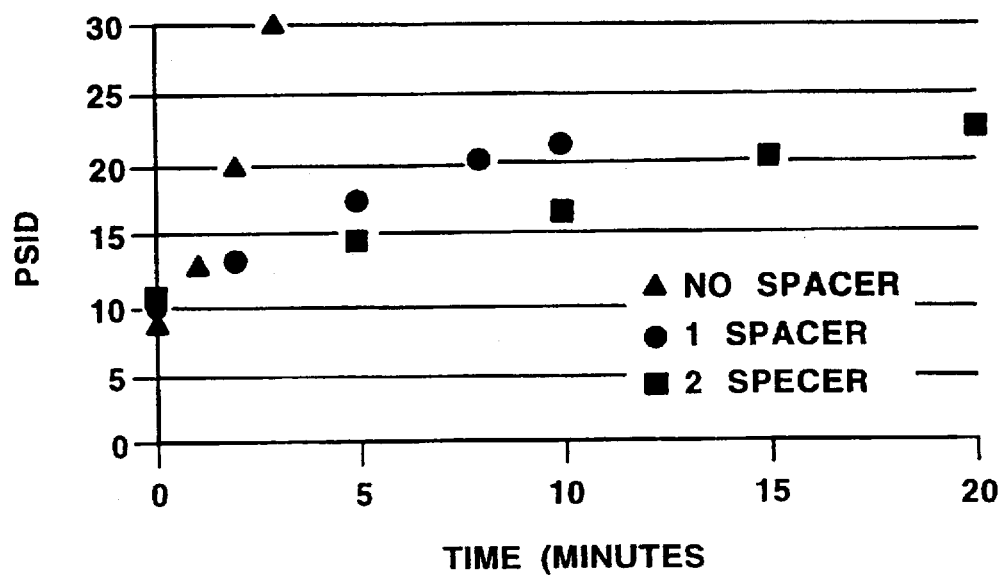
FIG. 21 is a graph showing the effect of one or more spacer layers on plugging characteristics of a filter construction.

The unfiltered paint composition was fed to 6 each of the depth filter and the pleated filter of this invention at a constant differential pressure across the filtration element of 16 psid. FIG. 20 shows the average flow rate (gallons per minute) for each filter (depth or pleated) through the filter over the time of filtration. As shown in FIG. 2, the depth filter were completely plugged within about 9 minutes after filtration was initiated. In contrast, the filter element of this invention exhibited a relatively constant flow throughput of about 2.5 gallons per minute after about 5 minutes from the time filtration was initiated. Filtration was continued for 48 hours with the filter of this invention with only a minimal increase in differential pressure.

Filtration was repeated with 6 filter elements of this invention in a common housing except that the filter elements were 20 inches high rather than 2 inches high. Filtration also was effected at 16 psid across the filter element. These filtration elements filtered a complete batch of 3000 gallons of the paint. In addition, the paint batch was recirculated through the filter elements for 48 hours with a minimal increase of differential pressure across the filter elements. In contrast, typical 20 inch depth filters (6) in the same arrangement become completely plugged only after about 60 minutes of filtering this paint composition.

EXAMPLE II

This example illustrates the need for a spacer layer of each surface of the filter layer to obtain effective filtration for extended time periods.

Please filtration elements were formed from (1) the filter layer 26 of FIG. 2 alone, (2) the filter layer and two spacer layer, each on one filter layer surface as shown in FIG. 2 or (3) the filter layer of FIG. 2 and two spacer layers 22 or 24 on each surface of the filter layer of FIG. 2. The filter layer and spacer layers were the same layers utilized in Example I and they were pleated as illustrated in FIG. 1 to form pleat about 0.46 inch long in the form of 20 inch high filtration elements. The filtration elements were positioned within a housing having an inlet for the unfiltered paint composition of Example I and an outlet for filtered paint composition. The filtration elements were positioned within a housing having an inlet for the unfiltered paint composition of Example I and an outlet for filtered paint composition.

The filtration element is considered to plugged when the pressure drop across the filtration element is 30 psid or higher. As shown in FIG. 2, the filtration element without a spacer plugged within about 3 minutes of use. Each of the filtration elements having at least one spacer layer positioned on each filter layer surface exhibited a relatively constant pressure drop after about 10 to 20 minutes of filtration.

EXAMPLE III

This example illustrate that the filtration element of this invention unexpectedly exhibits increased useful life at relatively high filtration flow rates of a particle containing paint composition.

Figure 22:
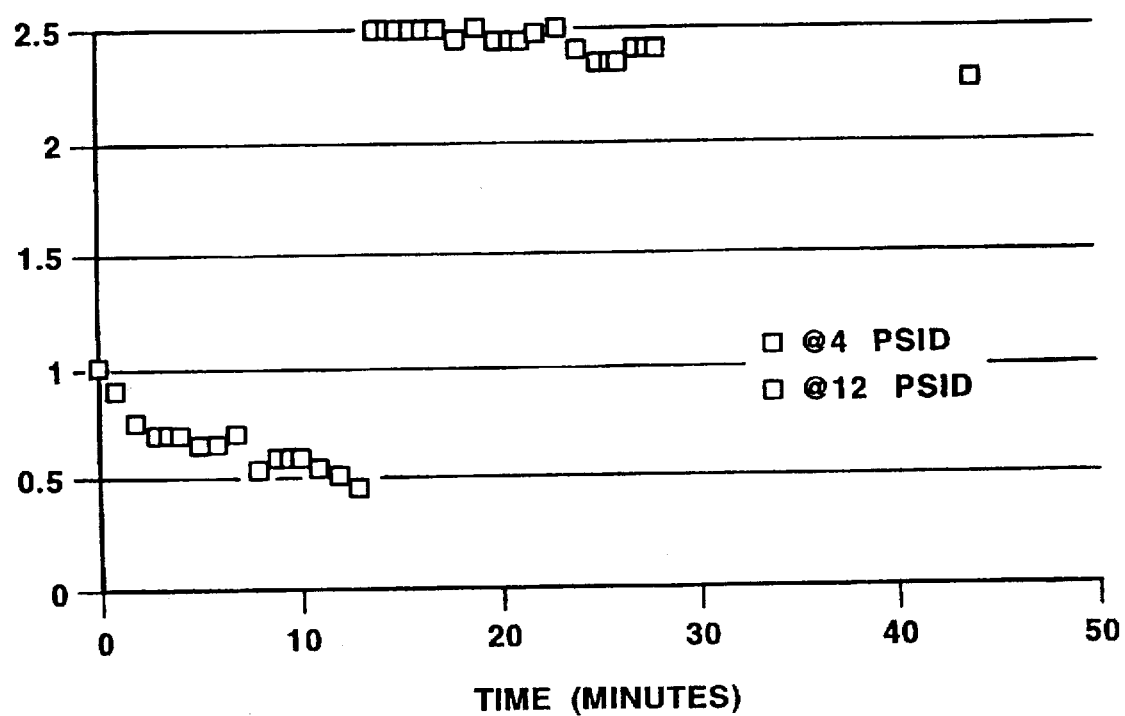
FIG. 22 is a graph showing the effect of paint flow rate on filter plugging characteristic.

The paint composition utilized in Example I was filtered through the pleated filtration element of this invention described in Example I. Initially the paint composition was passed through the filtration element at a constant differential pressure of 4 psid. The flow rate of the paint composition through the filtration element decreased with time indicating that plugging was effected. At 14 minutes after initiating filtration, the pressure across the filtration element was increased to 12 psid. At the increased pressure, the flow rate through the filtrations element increased and less plugging with time occurred. The results are illustrated in FIG. 22.

What is claimed is:

1. A filter cartridge for filtering a particle containing a paint composition or a particle loading slurry composition to remove particles of a predetermined size and larger comprising:

a spirally-wound multi-layer material having two opposed spiral end surfaces, said multi-layer material including at least two woven polymer filter layers having substantially uniform sized pores of about said predetermined size and at least two spacer layers; each surface of each filter layer contacting a spacer layer in a spirally wound unit, each of said spacer layers having at least one surface with raised projections, said spacer layers being sealed so that a first set of said spacer layers contacting each filter layer on a first surface is open to the atmosphere on a first spiral end surface and closed to the atmosphere on the second spiral end surface and a second set of said spacer layers contacting the second surface of each filter layer is open to the atmosphere on the second spiral end surface and closed to the atmosphere on the first spiral end surface, said spacer layers being arranged so that spacer layers open on opposing spiral end surfaces are not in contact with each other, the first set of spacer layers being sealed from the atmosphere along a widthwise edge adjacent the center of the spirally-wound material and along a widthwise portion remote from the center of the spirally-wound material.

2. The construction of claim 1 wherein the multi-layer material is wound around a core extending across the width of the web.

3. The construction of claim 1 wherein the multi-layer material is comprised of two filter layers and two spacer layers.

4. The construction of claim 3 wherein the multi-layer material is wound around a core extending the width of the material.

5. A filter cartridge for filtering a particle containing a paint composition or a particle loading slurry composition to remove particles of a predetermined sized and larger comprising:

a spirally-wound multi-layer material having two opposed spiral end surfaces, said multi-layer material including a fluid impermeable layer, a woven polymer filter layer having substantially uniform sized pores of about said predetermined size and two spacer layers; each surface of each filter layer contacting a spacer layer in a spirally wound unit, each of said spacer layers having at least one surface with raised projections, said spacer layers being sealed so that a first set of said spacer layers contacting each filter layer on a first surface is open to the atmosphere on a first spiral end surface and closed to the atmosphere on the second spiral end surface and a second set of said spacer layers contacting the second surface of each filter layer is open to the atmosphere on the second spiral end surface and closed to the atmosphere on the first spiral end surface, said spacer layers being arranged so that spacer layers open on opposing spiral end surfaces are not in contact with each other, the first set of spacer layers being sealed from the atmosphere along a widthwise edge adjacent the center of the spirally-wound multi-layer material and along a widthwise portion remote from the center of the spirally-wound multi-layer material.

6. The construction of claim 5 wherein the multi-layer material is wound around the core extending across the width of the material.

7. The construction of claim 5 wherein the fluid-impermeable layer circumscribes the outer area surface of the spirally-wound multi-layer material.

* * * * *